United States Patent [19]

Hasley

[11] Patent Number: 4,704,606
[45] Date of Patent: Nov. 3, 1987

[54] VARIABLE LENGTH PACKET SWITCHING SYSTEM

[75] Inventor: Lloyd A. Hasley, Carrollton, Tex.

[73] Assignee: American Telephone and Telegraph Company and AT&T Information Systems Inc., Holmdel, N.J.

[21] Appl. No.: 18,819

[22] Filed: Feb. 24, 1987

Related U.S. Application Data

[63] Continuation of Ser. No. 670,982, Nov. 13, 1984, abandoned.

[51] Int. Cl.$^4$ .............................................. H04Q 1/00
[52] U.S. Cl. .................................... 340/825.5; 370/82
[58] Field of Search ............... 364/200, 900; 370/79, 370/82, 83, 84, 85, 94, 99; 340/825.5, 825.51, 825.52

[56] References Cited

U.S. PATENT DOCUMENTS

| | | | |
|---|---|---|---|
| 4,281,380 | 7/1981 | DeMesa, III et al. | 370/94 X |
| 4,313,196 | 1/1982 | Oblonsky | 370/85 |
| 4,320,502 | 3/1982 | deVeer | 370/85 |
| 4,359,731 | 11/1982 | Beauford et al. | 370/85 X |
| 4,373,183 | 2/1983 | Means et al. | 370/85 X |
| 4,412,326 | 10/1983 | Limb | 370/85 |
| 4,451,881 | 5/1984 | Grice et al. | 370/85 X |
| 4,488,218 | 12/1984 | Grimes | 340/825.5 X |

OTHER PUBLICATIONS

Wecker, "Computer Network Architectures", Computer, Sep. 1979, pp. 58–71.
Bass et al., "Local Network Gives New Flexibility to Distributed Processing", Electronics, Sep. 25, 1980, pp. 358–366.
"Design and Use of Comflex-a Hardware-Controlled Packet Switch", IEE Proc., vol. 127, Pt. E, No. 6, J. A. McDermid, Nov. 1980.

Primary Examiner—Ulysses Weldon
Attorney, Agent, or Firm—Donald M. Duft; John C. Moran

[57] ABSTRACT

A packet switching system is disclosed for transmitting variable length packets between system ports. Each byte of each packet has a special one-bit field for indicating whether the byte is the last byte of a packet. A "1" in this field specifies that the byte is the last byte of a packet and activates port control circuitry that changes the potential on a system control conductor to indicate that the system data bus is now idle and free for use by other ports.

8 Claims, 6 Drawing Figures

DATA FRAMING CIRCUIT

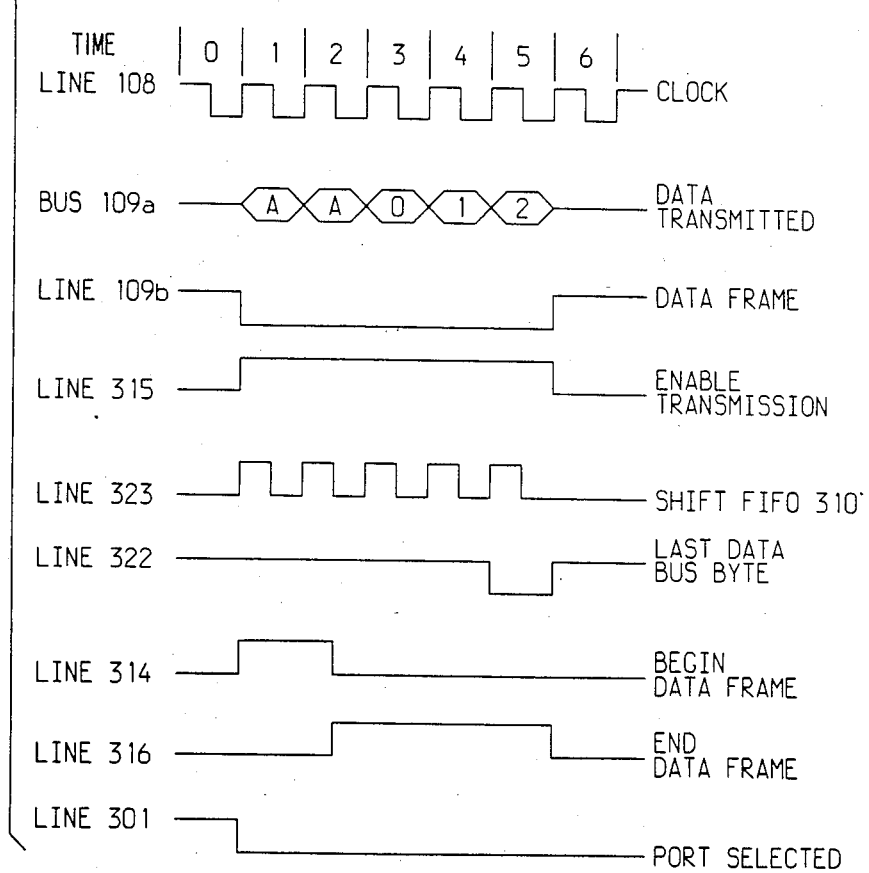

VARIABLE LENGTH PACKET SWITCHING SYSTEM

This application is a continuation of application Ser. No. 670,982, filed Nov. 13, 1984 now abandoned.

CROSS-REFERENCE TO RELATED APPLICATION

This application is related to the following co-pending applications: A. D. Franklin, L. A. Hasley, and J. E. Smith, Ser. No. 670,981, filed Nov. 13, 1984 and L. A. Hasley et al, Ser. No. 674,049, filed Nov. 21, 1984.

TECHNICAL FIELD

This invention relates to a packet switching system, and in particular, to a packet switching system for transmitting packets having a variable number of bytes.

BACKGROUND OF THE INVENTION

Packet switching systems typically transmit packets containing a specified fixed number of data bytes between system ports. However, it is rare that the data to be transmitted by a port at any given time can be formed into the number of bytes required to fill the specified size packet. Consequently, when a lesser amount of data is to be transmitted, such as a character or two, the transmitting port typically stuffs the remainder of the packet with null data to form a packet containing the specified number of bytes. Conversely, the system breaks a large block of data up into a plurality of packets when the data to be transmitted exceeds the specified size of a single packet.

This mode of operation has a number of disadvantages. The stuffing of a packet with null data is wasteful of system resources since a corresponding amount of system through-put is wasted in transmitting the null data. The breaking up of a large block of data into a plurality of packets is also inefficient since the transmitting port must initiate and win a new data bus arbitration operation before each packet can be transmitted. Also, the last packet normally has to be stuffed with null data.

Packet switching systems using variable length packets are known. However, these systems are atypical and they implement the techniques of variable length packets in a specialized manner that is not suitable for use in typical packet switching systems. For example, systems are known in which the header of each packet contains a byte in the beginning portion of the packet that specifies the number of bytes in the remaining portion of the packet. This is shown in the article entitled "Design and Use of Comflex-a Hardware-Controlled Packet Switch" by J. A. McDermid, published in IEE PROC., Vol. 127, Pt.E, No. 6, November, 1980. This technique performs satisfactorily but is unduly costly and complex. Other specialized arrangements using timing and the like are known, but are not of generalized applicability. Such systems are exemplified by U.S. Pat. No. 4,412,326 to J. O. Limb of Oct. 25, 1983.

SUMMARY OF THE INVENTION

The present invention overcomes the above discussed problems by providing a packet switching system in which packets of variable length are transmitted between system ports. This is achieved without the use of complex or costly control facilities. As before, the data received by a port for transmission are organized into and transmitted as packets. However, unlike the prior systems wherein each packet contains a specified fixed number of bytes, packets in my invention can be of any length as determined by the amount of data currently stored in a port that is waiting to transmit. If the amount of data to be sent is relatively small, the duration of the packet used to send it is relatively short. If the amount of data to be sent is relatively large, the duration of the packet is relatively long.

The duration of a packet is characterized by a framing signal applied by a transmitting port to a data bus control path termed a data frame line. In prior systems, the framing signal was of a fixed duration and was generated by subdividing the system clock. In my invention, the length of the framing signal is controlled by the transmitting port and varies with the length of the packet transmitted by the port.

A port begins the transmission of data over the system data bus by applying a low signal to the data frame line. This low advises all other ports that the data bus is presently busy. The transmitting port then applies the data it is storing, byte by byte, to the data bus. The port continues to transmit until all of the data stored in it has been transmitted. The last byte of each packet contains a special "end of packet" bit which is readout of a memory in the transmitting port when the last byte of the packet is applied to the data bus. The transmitting port responds to the readout of this end of packet signal by applying a high potential to the data frame line. This high signals the other ports that the data bus is idle and is therefore free to accept a packet from another port.

My invention is advantageous in that it produces a data packet that varies in byte length with the amount of data to be sent. My invention overcomes the disadvantages of the prior arrangements since the use of a variable length data packet length obviates the need to send null data to fill a fixed length packet when transmitting a small amount of data or to use more than one packet to send a large amount of data.

BRIEF DESCRIPTION OF THE DRAWING

FIG. 4 discloses the contents of FIFO 310;

FIG. 5 discloses the relationship among signals of various portions of the data framing circuit.

DETAILED DESCRIPTION

Figure 1:
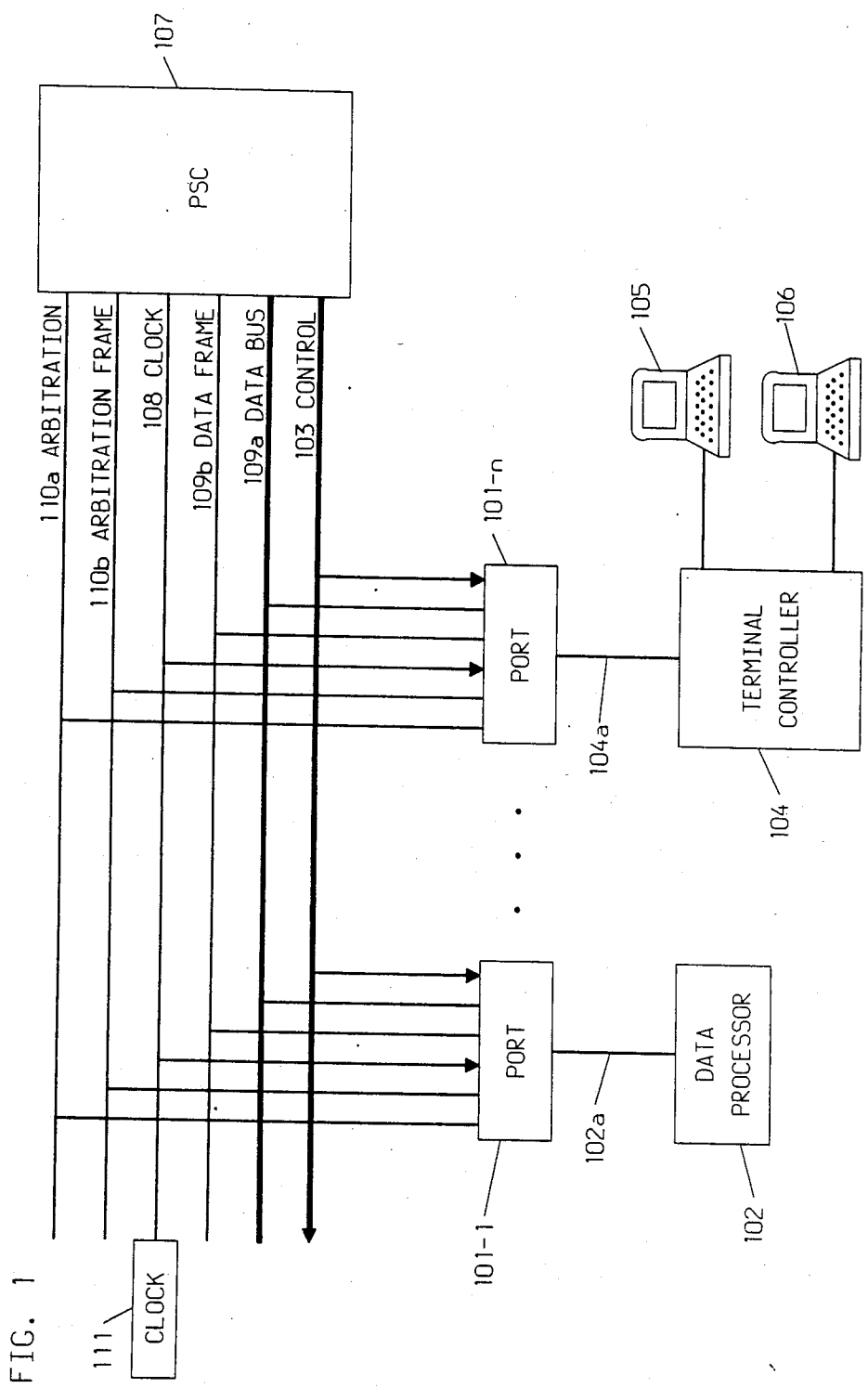
FIG. 1 discloses a packet switching system embodying the subject invention.

FIG. 1 discloses a packet switching system comprising one possible exemplary embodiment of the present invention. FIG. 1 discloses ports 101-1 through 101-n, packet switch controller (PSC) 107, data processor 102, terminal controller 104, terminals 105 and 106, clock 111, and paths interconnecting these components. Data bus 109a is one such path and comprises enough conductors to carry a parallel byte of data. Other paths include: control channel 103 which is used by packet switch controller (PSC) 107 to send control messages to the ports, arbitration line 110a which is used by ports to contend for access to data bus 109a, arbitration frame line 110b which is used by contending ports to prevent interruption of the arbitration process, data frame line 109b which is used by a transmitting port to prevent interruption of packet transmission, and clock line 108 which carries a synchronizing signals for the above-mentioned components.

The system of FIG. 1 is a distributed type packet switch in that packets are addressed to a destination port and station by a transmitting port rather than by a central switch. A user at terminal 105, for example, establishes a packet switch "call" to a destination, such as data processor 102, by dialing a called number associated with processor 102. The called number, along with the address of calling terminal 105, are sent as a packet via terminal controller 104, port 101-n, and data bus 109a to packet switch controller PSC 107. PSC 107 receives the dialed number, translates it into the addresses of port 101-1 and data processor 102, and returns these addresses over control channel 103 to port 101-n. The address of port 101-1 and data processor 102 are then stored in port 101-n along with the address of calling terminal 105.

Subsequent data sent by a user at terminal 105 are formed into packets by terminal controller 104. Each packet contains the station ID of station 105 in the leading bytes. Port 101-n replaces the calling station ID with the destination port and station ID and puts the packet onto the data bus 109a. The packetized data are then transmitted by port 101-n over data bus 109a to port 101-1. Port 101-1 recognizes its address in the first byte of the packet and then accepts the subsequent bytes of the packet for transfer to data processor 102. In so doing, port 101-1 strips off its own address from the received packet and sends the remainder of the bytes over path 102a to data processor 102 which recognizes its address and reads the data in the remainder of the bytes.

My invention relates to the source and nature of the framing signal on the data frame line 109b. The framing signal denotes the duration of a data packet by assuming a low state during packet transmission by any port and by assuming a high state when a packet is not being transmitted. The packet duration and the data frame line potential is controlled by the transmitting port. In the prior art, the data framing signal, and hence the packet, was of fixed duration and was generated by a clock circuit that divided recurrent clock pulses so that a packet included a fixed number of bytes.

Data frame line 109b is controlled by a transmitting port 101 which holds it low during packet transmission and lets it go high at the end of transmission. In this way, a currently transmitting port 101 signals all other ports when the data bus 109a is free for use by another port.

GENERATION OF VARIABLE LENGTH PACKETS

As already described, a user at terminal 105 dials the number of processor 102 to establish a packet "call" thereto. Packets can then be transmitted to a destination port over bus 109a after packet switch controller 107 enters the called port and station address translation information into the sending port 101-n.

Assume that, terminal controller 104 subsequently receives data from terminal 105 that is to be sent to data processor 102. Port 101-n receives and stores the data and contends for access to data bus 109a when it is ready to transmit a packet. When port 101-n wins access, it applies an address identifying the destination port and station as a first two bytes of a packet to data bus 109a. Port 101-n then applies to bus 109a the data it has received from terminal 105 as the remaining bytes of the packet. The duration of the packet depends upon the amount of data port 101-n has to transmit.

Port 101-n holds low the signal on data frame line 109b during the duration of the packet transmission. This duration is the time required for the transmission of the destination port and station addresses and the transmission of the data that port 101-n receives from terminal 105. Port 101-n lets data frame line 109b go high at the end of the packet transmission. This indicates that data bus 109a is idle and free to serve another port. The signal on line 109b remains high until a subsequently transmitting port draws it low.

The falling edge of the signal on data frame line 109b denotes that the accompanying byte on data bus 109a is the first byte of a new packet. Each port 101 examines this byte to determine whether the byte specifies its address. A receiver in the designated destination port 101-1 for the present call is enabled by the address of its port in the first byte of a packet. The receiver then receives and stores the address of data processor 102 followed by data for data processor 102.

PORT 101

Figure 2:
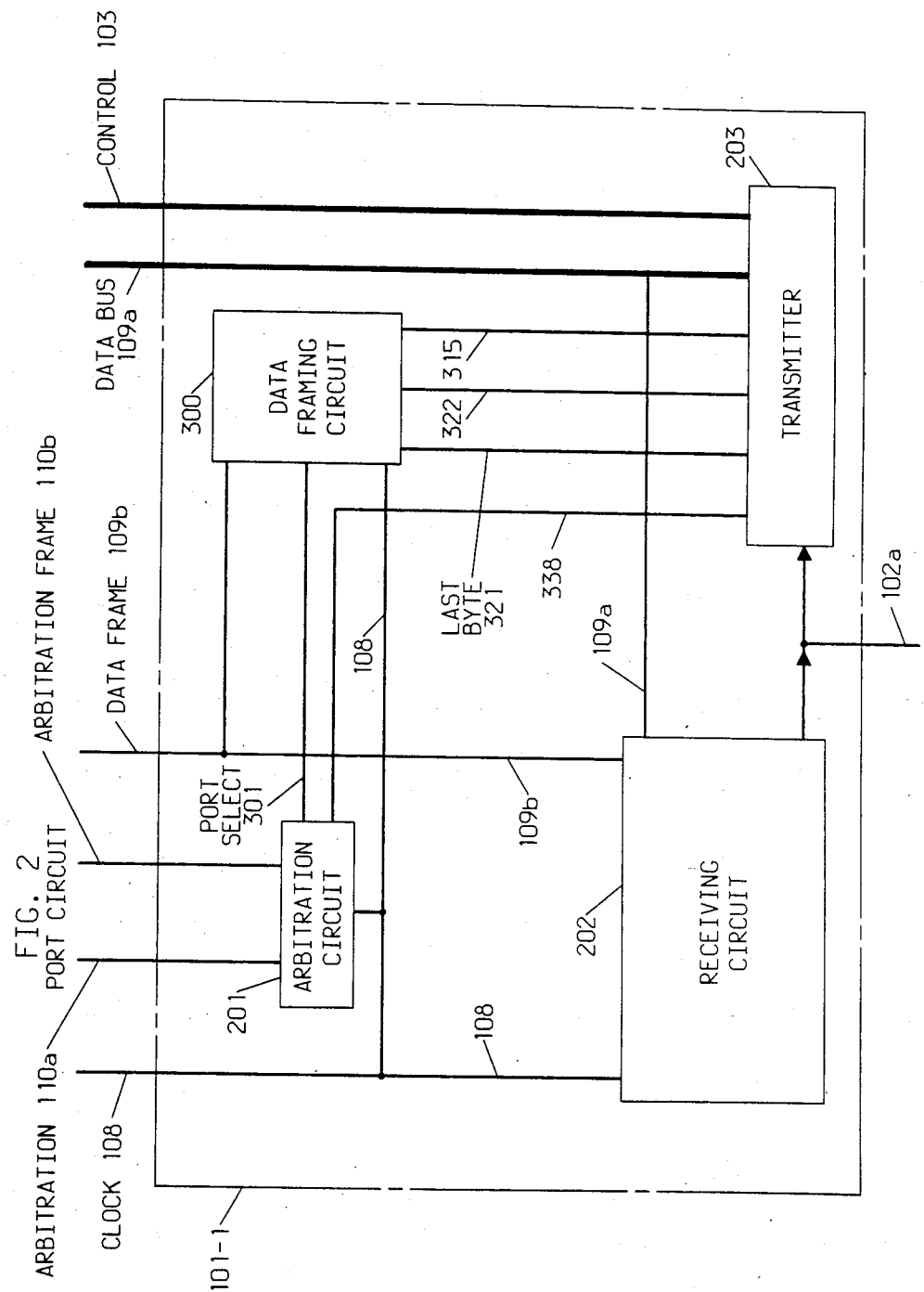
FIG. 2 discloses the components of a port.

FIG. 2 discloses details of a port 101. Shown are arbitration circuit 201, receiving circuit 202, transmitter 203, and data framing circuit 300 along with paths connecting these elements to each other and to the rest of the system.

The arbitration and receiving circuits are conventional. Receiving circuit 202 tests the first byte of a received packet to determine whether it contains the address of the port 101 of which circuit 202 is a part. If its address is specified, the receiving circuit 202 then receives the station address byte and data bytes that follow. The reception of the rising edge of the data framing signal at the end of a packet causes receiving circuit 202 to transfer a received packet to its dedicated station. This packet includes the station address and the data bytes of the packet. These and other functions remain unchanged.

Arbitration circuit 201 contends in a conventional manner with other ports for use of data bus 109a. It sends a high port-selected signal over line 301 when it wins contention. This high enables data framing circuit 300 and causes transmitter 203 to transmit a packet.

The framing signal 109b is provided by data framing circuit 300. It is connected to transmitter 203 by lines 315, 321 and 323. Line 321 is used to indicate the time at which the data frame signal on line 109b is to go high. The function of the other lines is subsequently described.

DATA FRAMING CIRCUIT 300

Before the present invention, a port such as 101 created packets limited to the length of the framing signal. Transmission started as the framing signal went low. Data was then transmitted until the framing signal went high.

Figure 3:
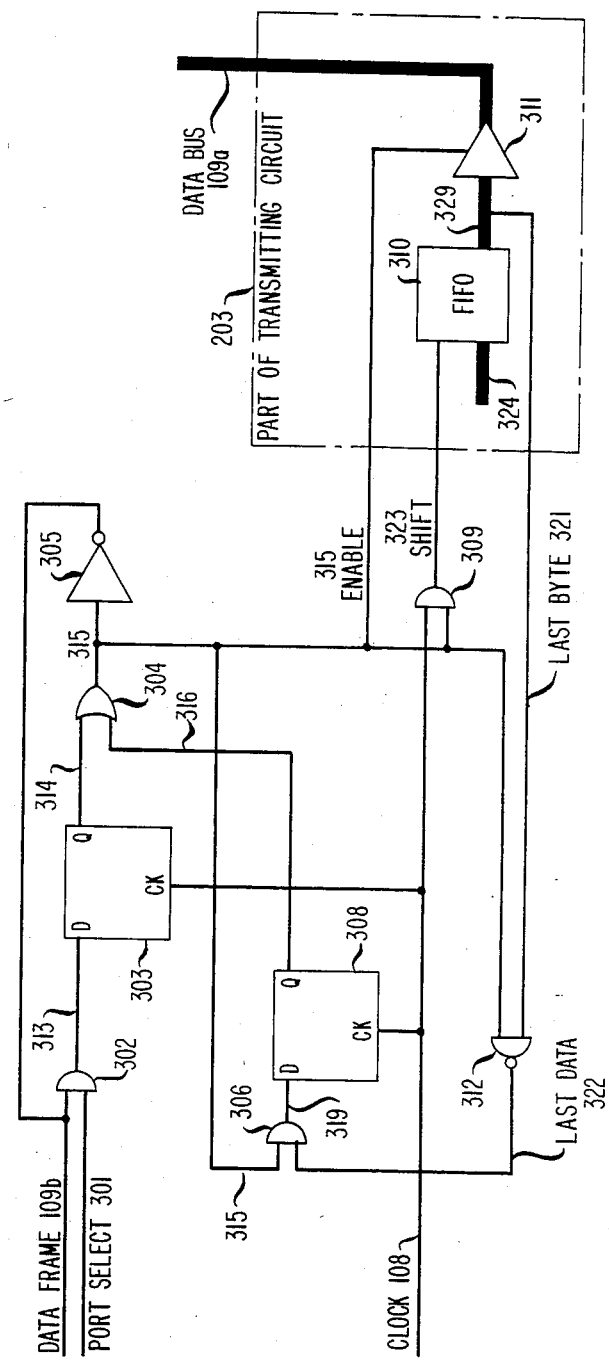
FIG. 3 discloses the data framing circuit.

FIG. 3 discloses the data framing circuit 300 which comprises gates 302, 304, 306, 309 and 312. It also comprises buffer 305 and data flip-flops 303 and 308. Also shown on FIG. 3 for clarity is the output circuitry of transmitter circuit 203 comprising FIFO 310 and tri-state buffer 311.

Four signals provide system and port status information to data framing circuit 300 so it can frame the transmission of a packet. The purpose of these signals is generally described below. The action of all of these signals is subsequently described in detail.

First, a high port selected signal on line 301 indicates that the port's arbitration circuit 201 of FIG. 2 has been granted access to data bus 109a. Second, a high data frame signal on line 109b indicates that data bus 109a is idle and is therefore free to accept the present port's transmission. Third, a signal on line 321 is high during the transmission of the last byte of a packet by the port's trnasmitter circuit 203. And fourth, the system clock on line 108 provides a synchronizing signal for data framing circuit 300.

The high port selected signal on line 301 and the high data frame signal on line 109b combine to indicate that conditions are correct for packet transmission to begin. The data framing circuit then enables transmission by causing transmitter circuit 203 to transmit one byte of data per clock pulse over data bus 109a. The signal on line 321 is high during the last byte of a packet transmitted by transmitter 203. This signal causes data framing circuit 300 to signal the end of transmission by allowing data frame line 109b to go high.

Arbitration circuit 201 provides a high enabling signal over line 301 to AND gate 302 when its port 101 is selected for access to data bus 109a. A high signal on data frame line 109b indicates an idle data bus 109a. The present port 101 must win the arbitration and the data bus must be idle before the present port 101 can transmit data. These conditions are fulfilled when AND gate 302 combines a high port selected signal on line 301 with a high signal on data frame line 109b to apply a high signal to line 313. This high signal on path 313 indicates that transmission from the present port 101 may begin. The next clock pulse on line 108 clocks the high on path 313 through data flip-flop 303 to line 314.

FIG. 5 illustrates the relationships between certain signals of FIG. 3 with respect to arbitrary units of time shown at the top of FIG. 5. Line and bus numbers are on the left of the illustrated waveforms. A brief indication of their functions are on the right. Hexagrams indicate the presence of data on bus 109a. An "A" within a hexagram indicates address byte. A numeral within a hexagram indicates the byte number of data sent on bus 109a.

A high signal on line 314 is passed through OR gate 304 over line 315, and through inverter 305 at the junction of times 0 and 1 to draw the signal on data frame line 109b low. This low signal indicates the beginning of a transmission of a packet by a port that has won contention. The high on enable line 315 is passed through gate 309 by the clock pulse on line 108 that begins with time 1. The resulting pulse on line 323 causes FIFO (first in first out) memory 310 of transmitter 203 to shift out the first byte of a packet to tri-state buffer 311. The high signal at enable line 315 enables buffer 311 of transmitter 203 so the byte just shifted out of FIFO 310 is applied by buffer 311 to data bus 109a. Thus, a high signal on enable line 315 both enables buffer 311 and enables the passage of clock pulses through gate 309 to line 323. The relationship, between the high gating signal on line 315 and the clocked gated signal on line 323 is shown on FIG. 5. Enabled gate 309 continues to transfer clock pulses from line 108 to FIFO 310 via line 323 as long as enable line 315 is high. Each pulse on line 323 causes FIFO 310 to shift out a byte of data.

FIFO 310 comprises a number of cascaded registers made up of data flip-flops. The contents of FIFO 310 before transmission are shown on FIG. 4. Each byte contains a two fields. The right field contains byte of data to be applied to bus 109a. The left field contains a bit that is low for all but the last byte of a packet.

Output register 400 of the FIFO contains a byte indicated by X's. This is a remaining byte of data from the previous transmission that is not to be transmitted again. This byte is disregarded, as subsequently explained, as the contents of register 401 are shifted out. FIFO register 401 contains the address of the port 101-1 that is the destination for the next packet to be transmitted. FIFO register 402 contains the address of the destination station. FIFO registers 403-05 contain bytes of data to be transmitted. Three bytes of data, bytes 0 through 2 are depicted in FIG. 4 for illustration purposes. There may be more or less data bytes in FIFO 310 depending on the size of the packet to be transmitted.

Before time 1, the unknown byte 400 is present at the output of FIFO 310 and the input of buffer 311. The byte is not applied to data bus 109a because buffer 311 is disabled by the low on line 315 as illustrated on FIG. 5 during time 0. At the junction of times 0 and 1, the rising edge of the shift pulse on line 323 causes FIFO 310 to shift one position and replace the unknown byte in register 400 with the port address byte of register 401. Thus, by the time buffer 311 is enabled by the high signal on line 315, the port adress byte 401 is already present at the buffer 311 input and it is the first byte of the packet that is applied to data bus 109a. The first byte of the packet in FIFO 310 applied to data bus 109a, therefore, is the destination port 101-1 address.

As the high signal on line 315 keeps gate 309 enabled, each subsequent clock signal on line 108 passes through gate 309 and causes one byte of data to be shifted out of FIFO 310 and through buffer 311 to data bus 109a. Finally, the end of the packet is denoted as a high on line 321 as the "last byte" bit is shifted out by the FIFO as next described.

Each register of FIFO 310 has a one bit field that stores a bit indicating whether the byte is the last byte of a packet. This last-byte bit is low in each FIFO location except for the location containing the last byte of the packet to be transmitted. A high bit is shifted through the FIFO when the last byte of the packet is readout. This high bit is applied to line 321. It passes through NAND gate 312, is inverted, and is applied to line 322. It is shown for time 5 of FIG. 5, that the last-byte bit is applied to line 322 with the last shift pulse on line 323. This is the time at which the last byte of data in the current packet is applied to data bus 109a.

Two actions end a transmission from the present port 101-1. Both actions result from the "last byte" signal on line 322. It is necessary to consider earlier signals affecting gate 304 to understand how the low signal on line 322 from NAND gate 312 raises the data frame signal of line 109b and disables the transmitter by applying a low signal to line 315.

The output of AND gate 302 goes low when data frame line 109b is drawn low by inverter 305 at the beginning of time 1. The next occurrence of a clock pulse on clock line 108, the beginning of time 2 of FIG. 5, clocks the low signal through data flip-flop 303. Line 314 applies this low to gate 304. However the high signal on line 315 and, therefore, the low on data frame line 109b is unaffected because line 316, the other input to OR gate 304, has meanwhile been made high as follows.

The input to gate 304 on line 316 is controlled by latch 308. During time 1, while the low signal on data frame line 109b is applied to AND gate 302, OR gate 304 applies a high to AND gate 306 via line 315. As the pulse on clock line 108 clocks the low signal from gate 302 through data flip-flop 303 between times 1 and 2, it clocks the high signal on line 315 and the output of gate 305 through data flip-flop 308 to line 316. Line 322 is high at this time. The high on line 316 keeps data frame line 109b low by way of OR gate 304, line 315, and inverting buffer 305. These actions take place at the beginning of time 2 and the relationship between these signals is apparent from an inspection of that point in time on the waveforms of lines 314, 315, and 316.

This paragraph describes how data framing circuit raises the data frame signal on line 109b at the end of a packet. FIFO 310 applies a high signal via path 321 to NAND gate 312 as it sends its last byte of a packet over data bus 109a during time 5. The high signal passes through gate 312 because of the high enable signal on line 315. Gate 312 inverts the high signal and applies a low to gate 306 via line 322. This low signal on line 322 is shown during time 5 on FIG. 5. Gate 306 applies the low signal to the data input of flip-flop 308. This low signal is clocked through data flip-flop 308 by the next pulse on clock line 108. This next pulse on line 108 is coincident with the end of the last data byte applied to data byte 109a by FIFO 310 and buffer 311 at the juncture of times 5 and 6. This low signal on line 316 makes the signal on line 315 low by means of gate 304. The low on line 315 raises the data frame signal on line 109b by means of inverting buffer 305.

The rising edge of the signal on data frame line 109b marks the end of the current transmission over data bus 109a. The next port that has data to transmit and has won data bus arbitration is enabled by the high signal on data frame line 109b.

TRANSMITTER CIRCUIT

Figure 6:
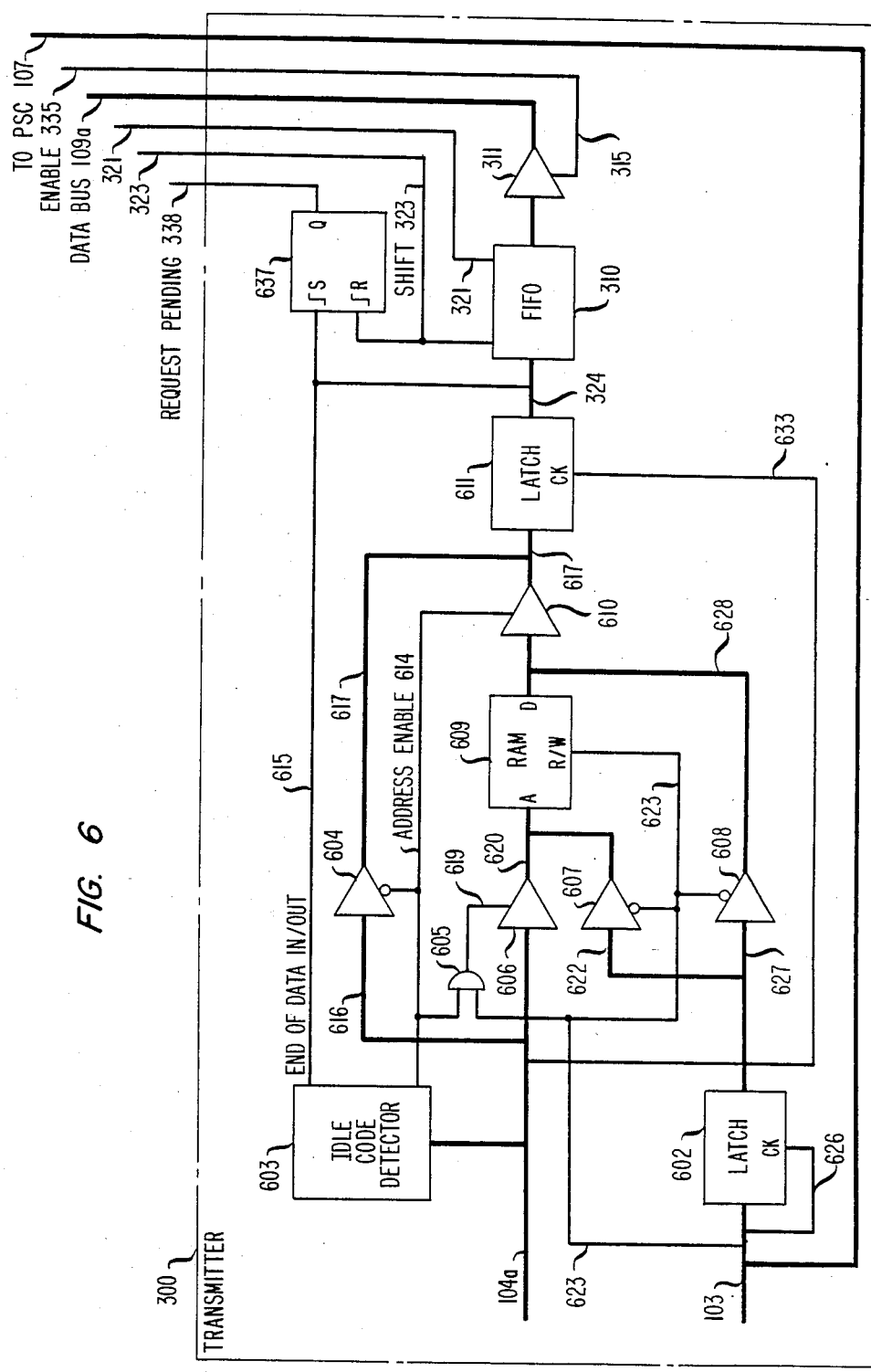
FIG. 6 discloses the transmitter circuit.

The following describes the operation of transmitter 203 which is shown in detail on FIG. 6. There are four steps to sending a packet of data regarding the transmitter 203 of port 101-n.

Step 1. During initialization of the system, PSC 107 programs each port such as 101-n, over control channel 103, with information termed action ID numbers. Each such number is two bytes long and each is assigned to one of the stations associated with a port such as 101-n. Each number identifies port 101-n and the station to which the number is assigned. Each number is coded and later used as the address portion of a pakcet that is directed to PSC 107. This packet is applied to data bus 109a by port 101-n at the beginning of a call. Thus each action ID number serves: to address PSC 107, to identify port 101-n, and to identify the number's associated station. Hereafter such a number is called an action ID.

Step 2. A call is established as follows. As station 105, for example, goes off-hook and dials the number of a destination station to set up a call, the off-hook stimulus and dialed destination station number are sent by calling station 105 to terminal controller 104. Controller 104 responds and sends to port 101-n a two byte call-action command identifying calling station 105 followed by a call-setup command that includes the dialed station number. Port 101-n translates the call-action command into the appropriate action ID. This action ID along with a subsequent call setup command is formed into and applied as a packet to data bus 109a by port 101-n. PSC 107 receives the packet and programs port 101-n with information over control channel 103 so port 101-n can thereafter translate the received station number of station 105 into the address of the destination port and station. PSC 107 also sends a packet to terminal controller 104 over data bus 109a to acknowledge receipt of the call-setup command.

Step 3. When station 105 subsequently sends data to terminal controller 104, terminal controller 104, in turn, sends the number of station 105 to port 101-n followed by the data that controller 104 has received from terminal 105. The calling station number 105 is translated by port 101-n into destination port and station addresses. The destination port and station addresses are assembled into the first two bytes of a packet. The data to be transmitted is inserted into the remaining bytes. The formed packet is then applied by port 101-n to data bus 109a after the port wins arbitration.

Step 4. When station 105, in effect, goes on-hook at the end of its generation of data, an on-hook stimulus is sent by the station 105 to terminal controller 104. Controller 104 responds and sends to port 101-n a two byte call-action command followed by a call teardown command that includes the dialed station number. Port 101-n translates the call-action command into an action ID. This action ID along with the subsequent call teardown command is applied as a packet to data bus 109a by port 101-n. PSC 107 receives the packet and programs port 101-n over control channel 103 so port 101-n can no longer translate the station number of station 105 into the address of a destination port and station.

FIG. 6 illustrates the circuitry of transmitter 203. A detailed description follows, but generally, the following are the functions of transmitter 203. Data from terminal controller 104 enter transmitter 203 over bus 104a. The calling station address received from terminal controller 104 on path 104a is translated into destination port and station addresses before transmission of data begins to the receiving station. Data from terminal 105 on path 104a bypass the translation circuitry. Finally, transmitter 203 applies the translated destination addresses and the data from terminal 105 to data bus 109a.

Calling station address data enter RAM 609 over path 104a, are translated as subsequently described, are delayed in latch 611, and stored in FIFO 310 for later transmission. Non address data received from station 105 bypass RAM 609 via buffer 604, they are delayed in latch 611, and they are stored in FIFO 310 for later transmission over data bus 109a. Translation data received from PSC 107 at the set up of a call enter transmitter 203 on control channel 103 and write RAM 609 by means of elements 609 and 605 through 608.

In more detail, the transmitter circuit of FIG. 6 further comprises a write circuit for RAM 609 including latch 602 and tri-state buffers 607 and 608. The transmitter proper comprises idle code detector 603, AND gate 605, RAM 609, latch 611, FIFO 310, and tri-state buffers 604, 606, 610, and 311.

Before considering an example packet transmission, it should be understood how transmitter 203 detects the reception of a packet from terminal controller 104 over bus 104a. Transmitter 203 includes means for detecting the beginning and end of a packet received over bus 104a from terminal controller 104. Idle codes consisting of bytes of null data are sent by terminal controller 104 over bus 104a when terminal controller 104 is not transmitting a packet on bus 104a. The end of these idle code bytes signifies the beginning of a packet transmission from terminal controller 104. The first idle code byte following the reception of a packet signifies the end of a packet transmission from terminal controller 104.

All received bytes are sensed by idle code detector 603 which produces a first signal in response to the end of idle code bytes and a second signal in response to the beginning of idle code bytes. First, idle code detector 603 produces a high pulse on address enable line 614 during the reception of the first and second bytes of a packet received on bus 104a following the last byte of idle code. Second, idle code detector 603 produces a high pulse on line 615 during the reception of the first byte of idle code after the end of a packet received on bus 104a. The pulse on address enable line 614 is high while an address is present on path 104a. It marks the first two bytes of a data packet received from terminal controller 104. These two bytes comprise the address of the calling terminal 105 that is sending data through terminal controller 104. The pulse on line 615 signals the end of the transmission of a packet over bus 104a from terminal controller 104.

An example call is set up as follows. Recall that terminal controller 104 initiates a call in response to an off-hook signal and the receipt of the dialed called station digits from calling station 105. Terminal controller 104 responds by sending over bus 104a a two-byte call-action command followed by a call-setup command that includes the dialed called station number. At the beginning of the call-action command, idle code detector 603 senses the end of the idle code and applies a high signal to address enable line 614. This signal disables buffer 604, enables buffer 610 and, via AND gate 604, enables buffer 606.

The two bytes of the call-action command on path 104a enter RAM 609 on bus 620. The RAM translates the call-action command and applies an action ID number to bus 617. This action ID serves: to address PSC 107, to identify port 101-n, and to identify calling station 105. The signal on line 614 goes low at the end the reception of the two-byte address on bus 104a. This low turns on buffer 604 and turns off buffers 610 and 606 so subsequently received bytes on path 104a bypass RAM 609 via buffer 604. Therefore, the action ID part of the incoming packet is applied to bus 617 via RAM 609 and buffers 606 and 610. The rest of the packet bytes arrive at bus 617 via buffer 604.

The last byte of each packet must be stored in FIFO 310 along with a bit indicating that it is the last byte. The source of this bit is idle code detector 603. Recall, however, that the high "end-of-data" bit on line 615 immediately follows the last byte of valid data received. Therefore the packet just described on bus 617 must be delayed so that the packet's final byte of data enters FIFO 310 at the same time as the "end of data" bit on line 615. The packet is delayed by latch 611 as follows.

A synchronizing clock pulse signaling the beginning of each byte is received over path 104a and enters transmitter 203 on path 104a from terminal controller 104. This signal is separated from path 104a on line 633. The data applied to latch 611 is delayed slightly by the circuitry leading to latch 611. Since the pulse on line 633 is not delayed, its leading edge arrives at latch 611 just before the beginning of the byte it originally synchronized. Therefore the previous data byte is still present at the input to latch 611 when the leading edge of the pulse for the next data byte arrives on line 633. This previous byte is latched by latch 611 which is leading leading edge triggered on path 633. Thus, when a current byte enters transmitter 203 on bus 104a, the previous byte received is applied under control of the sync signal for the current byte by latch 611 to bus 324. Thus, the data at the output of the latch 611 on bus 324 are effectively delayed by the width of one byte with respect to data entering transmitter 203.

The high pulse on path 615 occurs when the first byte of null data appears on 104a following the last byte of packet data. The purpose of the delay is achieved when the last byte of a packet is applied by latch 611 to the input of FIFO 310 at the same time the end-of-data-input pulse is applied over path 615 by idle code detector 603 to the input of FIFO 310. This end-of-data-input pulse is stored along with the last byte of packet data in FIFO 310. This bit is used to indicate the last byte when FIFO 310 is read.

For the example call, a packet comprising the action ID and the call setup command is now in FIFO 310 along with the end of packet bit stored with the last byte of the packet. FIFO 310 applies these over data bus 109a to PSC 107.

PSC 107 sends an acknowledgement packet over data bus 109a to terminal controller 104 in response to receipt of the packet just described. PSC 107 also programs port 101-n over control channel 103 so port 101-n can translate its subsequent reception of the station number of station 105 into the addresses of the destination port and station.

Assume transmitter 203 of FIG. 6 is an element of port 101-n thus programmed by PSC 107. RAM 609 of transmitter 203 is written to program port 101-n for the subsequent reception of the data from station 105 that is to be sent to processor 102. The data necessary to program the port are applied to bus 103 by PSC 107, latched by latch 602, and written into RAM 609 via buffers 607 and 608.

This paragraph describes how the first and second halves of the number of calling station is now applied sequentially to RAM 609 by the PSC to write the destination port and station numbers into the addressed RAM locations. A control pulse is transmitted on control channel 103 by PSC 107 along with the RAM addresses and data-to-be-written. This pulse appears on line 626 which is separated from control channel 103 and connected to the clock input of latch 602. This pulse causes latch 602 to apply the first half to the calling terminal's station number from bus 103 to bus 622. At the same time, latch 602 applies the destination port address from bus 103 to bus 627.

While these numbers are applied to their busses, and after they are stable, PSC 107 applies a low read/write pulse over control channel 103 and line 623 to AND gate 605, tri-state buffers 606 through 608, and the read/write input of RAM 609. The low pulse on line 623 disables tri-state buffer 606 via AND gate 605. This action opens the connection between bus 104a and the input of RAM 609. This is done to avoid interference to the writing process from any possible signal on bus 104a. The low pulse on line 623 also enables tri-state buffers 607 and 608. This action connects the address (A) and data (D) inputs of RAM 609, via busses 622 and 627 respectively, to their information source: the output of latch 602. The pulse puts RAM 609 in write mode for the instant that the pulse on line 623 is low. This causes the destination port address to be written at the address in RAM 609 corresponding to the first half of the calling terminal's station number.

The next data to appear on control channel 103 from PSC 107 are the destination station address and the second half of the calling terminal's station number. In the same way just described, the destination station address is written into RAM 609 at the RAM address corresponding to the second half of the calling terminal's station number. Therefore, when the two halves of the source terminal's station number are subsequently received over bus 104a and applied in sequence by buffer 606 to bus 620 at the beginning of a data transmission, RAM 609 uses the received data as address information and applies the destination port and station numbers in sequence to bus 628.

Packet data are transmitted from a source station to a destination station as follows after RAM 609 has been programmed as just described. First a path is established from bus 104a, through buffer 606 so that the number of calling station 105 can be translated by RAM 609 into destination port and station addresses. The following describes how the path is established.

Recall that idle code from terminal controller 104 ends and station numbers begin on bus 104a coincident with the beginning of a high signal on line 614. Recall too, that tri-state buffers 606 and 610 are enabled and tri-state buffer 604 is disabled by the resulting high on line 614. Because of these actions, the station number of station 105 that appears in the first two bytes of a transmission on bus 104a is applied to the address (A) input of RAM 609 via bus 620. Having been programmed as described earlier, RAM 609 applies destination port and station addresses to bus 617 in response to its receipt of the two halves of this station number.

After the destination addresses have been thus applied to bus 617, RAM 609 is bypassed so data bytes subsequently received by transmitter 203 on bus 104a pass via element 604 to bus 617 unaltered by RAM 609. After RAM 609 has performed its translation, the signal changes on line 614 to low as already described in connection with the operation of idle code detector 603. This low signal disables tri-state buffers 606 and 610 and enables tri-state buffer 604. Subsequent data bytes bypass RAM 609 via bus 616 and buffer 604 and appear unaltered at bus 617.

Recall that bytes on bus 617 are delayed in latch 611. Recall too, that at the end of the transmission, a high bit is sent by idle code detector 603 via line 615 to FIFO 310 to indicate the last byte of the transmission. The packet, is loaded into FIFO 310 after being thus delayed with its last byte marked by the bit just mentioned. FIFO 310's contents at this point are indicated in FIG. 4.

Flip-flop 637 is set by the high signal on line 615 when the last byte of a packet is applied to FIFO 310. Therefore, the signal on line 338 is high from the time FIFO 310 is loaded with a packet until the beginning of the process of shifting out data. This signal on line 338 is used to indicate that the transmitter has a full set of data. Line 338 is connected to arbitration circuit 201 and the high on line 338 provides the stimulus to activate the arbitration process for its port. Flip-flop 637 is reset by the first shift pulse on line 323. This is a pulse that is received from the data framing circuit and it shifts the first byte of data out of FIFO 310. A low-going signal on line 338 as flip-flop 637 resets, indicates the beginning of transmission over data bus 109a. This low signal is used to prevent further arbitration by port 101-n until FIFO 310 is again loaded with a full packet.

Return to the example transmission, wherein FIFO 310 contains a full packet and line 338 is high. After arbitration and when the present port 101-n wins access to data bus 109a, data framing circuit 300 of FIG. 2 sends signals over lines 232 and 315 that cause FIFO 310 to shift out its contents via buffer 311 and data bus 109a. Data framing circuit 300 sends a high signal over line 315 to enable buffer 311 and, while that signal is high, a series of pulses is sent over line 323 to shift data out of FIFO 310.

The bit indicating the last byte of data to be transmitted is shifted out on line 321 as the last byte of the current set of data is transmitted over line 109a. This bit causes data framing circuit 300 of FIG. 2 to end the transmission by ending the pulse train on line 323 and by bringing low both signals on lines 323 and 315 to end the example transmission. At the same time, data framing circuit 203 raises the logic level on data frame line 109b.

Station 105 of FIG. 1 continues to send data to terminal controller 104. Terminal controller 104 continues to prepare packets consisting of the number of station 105 and the data generated by station 105. Terminal controller 104 sends each such packet to port 101-n. Port 101-n continues to translate the number of station 105 into the address of the destination port 101-1 and the destination station 102. For each packet received from terminal controller 104, port 101-n goes through the entire arbitration process already described. Having determined that it has won contention for use of data data bus 109a, port 101-n transmits the data from calling station 105 to destination station 102 by means of packets addressed to that station.

When the call is completed, station 105 sends the equivalent of an on-hook signal to terminal controller 104. In response, terminal controller 104 sends a call-action command to port 101-n as it did to set up the call. The call-action command is followed, however, by a call-teardown command in this case. The call-teardown command includes the dialed station number. Again, port 101-n translates the call-action command into the action ID. Port 101-n again makes up a packet of the action ID and the associated data: in this case, the call-teardown command. Port 101-n sends this packet to PSC 107. In response to receipt of the action ID and call-teardown command, PSC 107 programs port 101-n via control channel 103 as it did to set up the call. To tear down the call, however, the number of station 105 is associated with an fictitious station address when port 101-n is again programmed.

What is claimed is:

1. In a packet switching system having a plurality of ports interconnected by a communication cable comprising a data bus and arbitration conductor and arbitration frame conductor and data frame conductor and control bus and a packet switch controller for initializing said ports via said control bus and each of said ports interconnected to a terminal controller that serves a plurality of customer terminals, each of said ports comprising:

an address storage memory having been initialized by said packet switch controller via said control bus responsive to receipt of data from one of the customer terminals via the interconnected terminal controller to be transmitted over said data bus to another port for accessing stored address information identifying said other port;

a temporary memory for storing remaining data from said customer terminal;

a first-in first-out memory responsive to the accessed address information and the remaining data for forming a packet;

a first detector circuit responsive to the end of said data having been stored in said first-in first-out memory for generating a signal indicating said end of said data;

an arbitration circuit reponsive to said signal indicating said end of said data for requesting access to said data bus on behalf of said port by signaling on said arbitration conductor;

said arbitration circuit further responsive to a signal on said arbitration frame conductor indicating access granted to said data bus for generating a signal indicating said port selected to access said data bus;

a gate circuit for determining the concurrence of said signal indicating said port selection and a signal received via said data framing conductor indicating that said data bus is idle;

a control circuit responsive to the concurrence determination for applying a busy signal to said data frame conductor;

a clock enable circuit responsive to said concurrence determination for transmitting clock signals to said first-in first-out memory;

said first-in first-out memory responsive to said clock signals for transmitting the formed packet on said data bus;

said clock enable circuit further responsive to the application of said busy signal by said control circuit to said data frame conductor for continuously applying said busy signal to said data frame conductor;

a second detector circuit for determining the end of transmission of said packet on said data bus; and said clock enable circuit further responsive to the determination of said end of transmission of said packet for ceasing to apply said busy signal to said data frame conductor.

2. The system of claim 1 wherein said control circuit comprises:

a first flip-flop responsive to the concurrence determination for switching from a first to a second state;

an OR circuit responsive to said first flip-flop being in said second state for generating said busy signal; and a bus driver circuit responsive to the generated busy signal for transmitting said generated busy signal on said data frame conductor.

3. The system of claim 2 wherein said second detector further responsive to a portion of said packet remaining in said first-in first-out memory for generating a signal indicating that the transmission of said packet is still continuing;

said clock enable circuit comprises a first AND gate responsive to the signal indicating the continuation of transmission of said packet and the transmission of said busy signal for generating a flip-flop control signal;

a second flip-flop responsive to said flip-flop control signal for switching from a first to a second state to control the application of said busy signal to said data frame conductor via said OR gate; and a second AND gate responsive to said transmission of said busy signal and clock signals for retransmitting said clock signals to said first-in first-out memory.

4. The system of claim 2 wherein said OR gate circuit responsive to said second flip-flop being in said second state for continuously applying said busy signal to said data frame conductor via said bus driver circuit.

5. The system of claim 4 wherein said first detector circuit comprises a subcircuit for determining the end of data from said terminal controller; and a third flip-flop responsive to the determination of the end of data from said terminal controller for switching from a first to a second state thereby generating said signal indicating said end of said data.

6. In a packet switching system having a plurality of ports interconnected by a communication cable comprising a data bus and arbitration conductor and arbitration frame conductor and data frame conductor and control bus and a packet switch controller for initializing said ports via said control bus and each of said ports interconnected to a terminal controller that serves a plurality of customer terminals, each of said ports comprising:

an address storage memory for storing address memory identifying ports on said system;

said packet switch controller responsive to an initialization of said system for writing said address information into said address storage memory;

said address storage memory responsive to receipt of data from one of the customer terminals via the interconnected terminal controller to be transmitted over said data bus to another port for accessing said stored address information identifying said other port;

each of said ports further comprising a temporary memory for storing remaining data from said customer terminal;

a first-in first-out memory responsive to the accessed address information and the remaining data for forming a packet;

a first detector circuit for determining the end of data from said terminal controller;

a first flip-flop responsive to the determination of the end of data from said terminal controller for switching from a first to a second state thereby generating a signal indicating the end of said data;

an arbitration circuit responsive to said signal indicating said end of said data for requesting access to said data bus on behalf of said port by signaling via said arbitration conductor;

said arbitration circuit further responsive to a signal received via said arbitration frame conductor indicating access granted to said data bus for generating a signal indicating said port selected to access said data bus;

a gate circuit for determining the concurrence of said signal indicating said port selected and a signal received via said data framing conductor indicating that said data bus is idle;

a second flip-flop responsive to the concurrence determination for switching from a first to a second state;

an OR circuit responsive to said second flip-flop being in said second state for generating a busy signal;

a bus driver circuit responsive to the generated busy signal for transmitting said generated busy signal on said data frame conductor;

a second detector circuit responsive to a portion of said packet remaining in said first-in first-out memory for generating a signal indicating that the transmission of said packet is still continuing;

a first AND gate responsive to the signal indicating the continuation of transmission of said packet and the transmission of said busy signal for generating a flip-flop control signal;

a third flip-flop responsive to said flip-flop control signal for switching from a first to a second state;

said OR gate further responsive to said third flip-flop being in said second state for continuously applying said busy signal to said data frame conductor;

a second AND gate responsive to said transmission of said busy signal by said OR gate and clock signals for retransmitting said clock signals to said first-in first-out memory; and said first-in first-out memory responsive to said clock signals for transmitting the formed packet to said data bus.

7. The system of claim 6 wherein said second detector circuit further responsive to the end of transmission of said packet for generating a signal indicating said end of transmission of said packet on said data bus;

said first AND circuit further responsive to said signal indicating said end of said packet for generating another flip-flop control signal; and said third flip-flop being further responsive to said other flip-flop control signal for switching from said second state to said first state.

8. A method of operating a packet switching system having a plurality of ports interconnected by a communication cable comprising a data bus and an arbitration conductor and arbitration frame conductor and data frame conductor and control bus and a packet switch controller for initializing said ports via said control bus and each of said ports interconnected to a terminal controller that serves a plurality of customer terminals and each of said ports comprises an address storage memory and a temporary memory and a first-in first-out memory and a first detector circuit and an arbitration circuit and a gate circuit and a control circuit and a clock enable circuit and a second detector circuit, said method comprises the steps of:

accessing from said address storage memory stored address information identifying another port in response to receipt of data from one of the customer terminals via the interconnected terminal controller to be transmitted over said bus to said other port with said accessed information having been stored by said packet switch controller via said control bus during an initialization of said system;

storing remaining data from said customer terminal in said temporary memory;

forming a packet by said first-in first-out memory in response to said accessed address information and the remaining data;

generating a signal by said first detector circuit indicating the end of said data in response to the end of said data having been stored in said first-in first-out memory;

requesting access to said data bus on behalf of said port by said arbitration circuit by signaling on said arbitration conductor in response to said signal indicating said end of said data;

generating a signal indicating said port selected to access said data bus by said arbitration circuit in response to a signal on said arbitration frame conductor indicating access granted to said data bus;

determining by said gate circuit the concurrence of said signal indicating said port selection and a signal received via said data framing conductor indicating that said data bus is idle;

applying a busy signal to said data frame conductor by said control circuit in response to the concurrence determination;

transmitting clock signals to said first-in first-out memory by said clock enable circuit in response to said concurrence determination;

transmitting the formed packet on said data bus by said first-in first-out memory in response to said clock signals;

continuously applying said busy signal to said data frame conductor by said clock enable circuit in response to the application of said busy signal by said control circuit to data frame conductor;

determining the end of transmission of said packet on said data bus by said second detector circuit; and ceasing to apply said busy signal to said data frame conductor by said clock enable circuit in response to the determination of said end of said packet.

* * * * *